(12) United States Patent
Cheng et al.

(10) Patent No.: US 12,539,598 B1
(45) Date of Patent: Feb. 3, 2026

(54) MULTI-FUNCTION MODULAR RECONFIGURABLE MODULAR ROBOTIC VEHICLE

(71) Applicants: Kun Cheng, Inver Grove Heights, MN (US); Wenyan Wu, Inver Grove Heights, MN (US)

(72) Inventors: Kun Cheng, Inver Grove Heights, MN (US); Wenyan Wu, Inver Grove Heights, MN (US)

( * ) Notice: Subject to any disclaimer, the term of this patent is extended or adjusted under 35 U.S.C. 154(b) by 265 days.

(21) Appl. No.: 18/239,621

(22) Filed: Aug. 29, 2023

Related U.S. Application Data

(60) Provisional application No. 63/403,466, filed on Sep. 2, 2022.

(51) Int. Cl.
*B25J 5/00* (2006.01)
*B25J 11/00* (2006.01)
*B25J 19/00* (2006.01)

(52) U.S. Cl.
CPC ............. *B25J 5/007* (2013.01); *B25J 11/008* (2013.01); *B25J 19/005* (2013.01)

(58) Field of Classification Search
CPC ......... G05B 19/39468; G05B 19/40298; B25J 5/007
See application file for complete search history.

(56) References Cited

FOREIGN PATENT DOCUMENTS

| CN | 108657089 A | * | 10/2018 | ......... A63F 13/2145 |
|---|---|---|---|---|
| GB | 2566017 A | * | 3/2019 | ........... B05B 12/122 |
| WO | WO-2014007729 A1 | * | 1/2014 | ............. A01D 42/00 |
| WO | WO-2016165721 A1 | * | 10/2016 | ............... B60D 1/04 |

* cited by examiner

*Primary Examiner* — Karen Masih
(74) *Attorney, Agent, or Firm* — Westman, Champlin & Koehler, P.A.; Z. Peter Sawicki

(57) ABSTRACT

A modular robot vehicle comprising of a power module, a plurality of motor modules, a plurality of wheel or propeller drive modules, entertaining module, and an optional attachment module, where a combination of different modules can be selectively replaceable and configurable to fulfill a desired function in accordance with capabilities of an extension module and practical requirements. The extension module may be one of a plurality of interchangeable, heterogenous extension modules that are operably attachable to the vehicle body.

13 Claims, 9 Drawing Sheets

MULTI-FUNCTION MODULAR RECONFIGURABLE MODULAR ROBOTIC VEHICLE

CROSS-REFERENCE TO RELATED APPLICATION

This application claims priority to and the benefit of U.S. provisional patent application Ser. No. 63/403,466, filed on Sep. 2, 2022, the contents of which are incorporated herein in their entirety.

BACKGROUND

The present invention relates to robotic vehicles and, more specifically, to a robotic vehicle that has a modular construction.

With the continuous improvement of living standards and advances in technology, there is an ever-increasing interest in reducing human efforts in many time-consuming, repetitive household activities by an autonomous system. In the area of households, robot devices are invented and emerging in a variety of applications, such as wagon pulling, lawn mower, dog walking, floor cleaning, and heavy duty moving.

Conventionally, most of the efforts have been made in improving the performance of a single robot designed for a particular function or task. Meanwhile, with an increase in the desire for automation of more activities, a proliferation of specialized autonomous devices have come on the scene. As a result, there is a need for robots capable of performing a plurality of tasks. For example, a family robot operating may be tasked with loading/unloading items on a daily basis. It may also attach to a young kid or cargo trailer for family trips. The robot may also attach with a lawn mower module and maintain the yard. The robot may then need to work for towing the heavy trailer/boat on summer and blowing snow on winter.

To achieve the above purpose, design and implementation generally follows as a single robot with a plurality of interchangeable modular attachments in support of different tasks; or a commercial robotic system with multiple robots coordinated by changing hubs.

For the single multi-task robot, it is rarely addressed, if at all, how to adapt robots to a plurality of tasks of varying complexity and specific heterogeneity. Currently, the multi-task robot adopts a division of main/drive/power module from the attachment module and connects them with some form of universal interface: for example, with extended working modules by common technical implementation (a cutting deck, a snow throwing attachment, a brush cutting attachment, a sweeping attachment, and/or the like it), some robots can perform similar yard maintenance tasks that typically operate in a defined boundary.

However, it is far from enough to only consider power module (battery pack, charging station, etc.) and connection interface when it comes to heterogeneous tasks that require different technical performances or practical needs. For example, when the robot works as a daily-use, portable vehicle to pull a kid trailer or payload wagon outside, the robot is expected to be low or medium in weight and energy consumption at a medium/high speed and low/medium torque. When the robot is used as a family lawn mower or snow mover, it is expected to have medium speed and low/high torque with less consideration on weight and energy cost (since it is confined to be used at home and charging is usually available at any time). When the robot is used as a seasonal, heavy duty mover for boat or trailer, the robot requires extremely high torque at a relatively low speed where weight and energy can be ignored.

Cost is also always a common important factor in the civilian robot market. Costs range from a few hundred to thousands of dollars, to buy a single-purpose or limited multi-functioned (usually 2-3 similar functions) household robot. As a result, it becomes uneconomical and unaffordable if a family considers purchasing multiple robots for different chores. Replacement and maintenance costs are also major concerns in practical use as it is common that the robot's motor stops running after a while due to misuse or its own life span and environment limits.

Accordingly, there is a need in the art for improved design and methods that incorporate different modules (i.e., power module, motor module, wheel module, attachment module) supporting easy-accessible exchangeability, lower-cost maintenance, and high reusability to fulfill the robot with a plurality of modular attachments on tasks of varying technical complexities and practical requirements.

SUMMARY

Aspects of the present disclosure relate to a moving robotic device configured to perform multiple tasks. Systems provide apparatuses, and methods for multi-tasking robots that may be used in various home, educational or commercial applications. Home applications include, for example, payload moving, yard maintenance, snow blowing, and/or trailer/wagon/RV/boat towing.

A robot vehicle according to embodiments here comprises a power module and control circuitry configured to execute stored instructions to direct operation of the robotic vehicle as well as at least one motor module that is responsive to the control circuitry and configured to propel the robot vehicle. The robot vehicle further comprises at least one drive module comprising a drive wheel or propeller, and an optional connector for coupling between a motor module and a drive wheel or propeller.

In one or more embodiments, the robot vehicle is further configured for operable connection with one or more of a plurality of different extension modules, where the extension modules are interchangeable and attachable to the body of the robot vehicle. Embodiments further include optional inclusion of entertainment modules configured for wireless connection to the internet and/or other devices via Bluetooth connection.

One or more embodiments of the robot vehicle include a hitch joint at a rear portion of the robot vehicle body for connection to an extension module such as a bike trailer including an arm frame that is operably coupled to the hitch joint and can be controlled and pulled by the powered robot vehicle.

One or more embodiments of the robot vehicle comprise an opening at a lower or bottom portion of the robot vehicle body for enabling connection to an extension module where the extension module may be cutting deck that engages with one motor module through the opening and supports a plurality of cutting spades where the operable connection with the motor module allows the plurality of cutting spades to be rotated by operation of the motor.

One or more embodiments of the robot vehicle comprise one compartment at a forward portion of the robot vehicle body with releasable joints for coupling to an extension module where the extension module is a snow moving plow that is mounted to the front compartment and can be pushed and controlled by the powered robot body.

One or more embodiments of the robot vehicle comprise a support frame with an attachment joint (e.g., hitch ball) extending from the vehicle chassis and can be used to tow an extension module where the extension module comprises a personal watercraft, boat, trailer or the like.

An aspect of the present disclosure relates to a motor housing component connectable to a robot vehicle, comprising a drive motor therein for the robotic vehicle and operably couplable to at least one drive wheel for the robot vehicle; a terminal interface couplable to control circuitry for the robot vehicle and when coupled thereto, an inner drive motor is responsive to control by the control circuitry; an aperture for exposing an outer shaft of the inner drive motor for connecting the motor to a wheel module or extension module and wherein the housing is insertable into a designated motor compartment in a chassis of the robot vehicle at a customizable depth so that the track width can be adjusted and securable therein by way of one or more release buttons on the motor housing component which connect to one or more apertures in the chassis.

Yet another aspect of the present disclosure relates to a robot vehicle chassis for mounting one or more modularized components to the robot body comprising a plurality of compartments with releasable couplings for different sized motor housing components; at least one compartment with a releasable coupling for receiving a motor housing component; at least one slot for power modules; at least one compartment at a forward portion of the chassis and with a releasable coupling to attach to a first extension module; at least one hitch interface at a backward portion of the chassis that is maneuverable to attach and detach a second extension module; and an opening at a bottom portion of the chassis through which a third extension module is connectable therethrough.

DETAILED DESCRIPTION

Figure 1A:
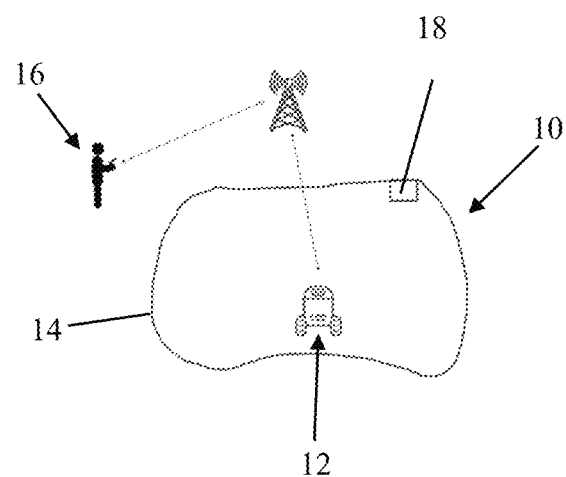
FIGS. 1A and 1B illustrate operating environments for a robot vehicle according to one or more embodiments described herein.

Robotic systems according to embodiments herein may include a housing component that is removably couplable to the robot. For example, the motor housing component may be pluggable into and unpluggable from the robot. The motor housing component may comprise a drive motor, a terminal interface, and a housing.

The drive motor is provided for energizing the robotic vehicle, via the at least one drive module.

The terminal interface may be coupled/decoupled to the control circuitry, and when coupled, the inner drive motor is responsive to control by the control circuitry.

A hole may also be provided for exposing the outer shaft of the inner motor so that the motor can connect to drive modules or extension modules.

The housing may be configured to be pushed into the designated motor compartment in the robot chassis. For example, the housing is insertable into a designated motor compartment in a chassis of the robot vehicle at a customizable depth so that the track width can be adjusted and securable therein by way of one or more release buttons on the motor housing component which connect to one or more apertures in the chassis. A release button may be used to secure the pushed housing compartment and be pressed to pull the component out from the motor unit in the robot chassis wherein the release button is just one form of hitch mechanisms that can be extensible to engage the coupling and decoupling between the motor housing and motor unit in the robot chassis.

Additional aspects of this disclosure relate to a chassis. The chassis provides separate structures or containers for mounting modularized components used to power and control the robot body and its extension attachments. The chassis may comprise a plurality of compartments with releasable couplings for small or medium motor housing components. The chassis may comprise a compartment with releasable coupling for a big motor housing component and at least one slot for power modules or power packs.

The chassis may also comprise or support at least one compartment at the forward portion with releasable coupling to attach an extension module. For example, the extension is a snow moving module, wherein the snow moving module is one of a plurality of interchangeable extension modules that can be pushed or pulled by the robotic system.

The chassis may further comprise at least one hitch interface at a rearward portion that is maneuverable to attach and detach a payload cart, wherein the hitch interface is a structure well known in the industry and therefore is not described in further detail herein. The payload cart is also one of a plurality of interchangeable extension modules that are attachable to the chassis.

The chassis may further comprise an opening at a bottom portion through which extension module is mountable. For example, a cutting deck is releasably and pivotally connected to the motor, wherein the cutting deck is one of a plurality of interchangeable extension modules.

In one or more embodiments, a robot vehicle comprises a power module, at least one motor module, and at least one drive module. Optionally, the robot vehicle may be provided with an optional entertainment module.

The power module includes a power source and control circuitry configured to execute stored instructions to direct operation of the robotic vehicle.

The at least one motor module may be replaceable and configurable such that the motor module is responsive to control by the control circuitry and propel the robot vehicle and/or an extension module.

The at least one drive module may comprise a drive wheel or propeller and an optional connector for coupling between a motor module and a drive wheel or propeller.

The optional entertainment module may support Bluetooth play or other recreational activities.

The robot vehicle may also comprise a hitch joint at a front or rear portion of vehicle body. Additional attachment mechanisms may include but are not limited to a bike trailer including an arm frame that is operably coupled to the hitch joint and can be controlled and pulled for extend durations (e.g. hours) by the powered robot. The bike trailer is one of a plurality of different interchangeable extension modules that are attachable and may be attached to the vehicle body.

Another embodiment of the robot vehicle comprises a power module including a power source and control circuitry configured to execute stored instructions to direct operation of the robotic vehicle. At least one replaceable and configurable motor module is provided and responsive to control by the control circuitry and propel the robot vehicle and/or an extension module. The robot vehicle also comprises at least one drive module which includes a drive wheel or propeller and an optional connector for coupling between a motor module and a drive wheel or propeller. This robot vehicle may further comprise an opening at the bottom portion of the vehicle body for a cutting deck that engages with one motor module through the opening and support a plurality of cutting spades, the plurality of cutting spades being rotated with the motor by a power source of the power module. While the cutting deck is described herein, the cutting deck is one of a plurality of different interchangeable extension modules that are attachable to the power module. Similar to the above, the robot vehicle of this embodiment may also be provided with the optional entertainment system described above.

In another embodiment, the robot vehicle may comprise a drive wheel or propeller and an optional connector for coupling between a motor module and a drive wheel or propeller and one compartment at the forward portion of vehicle body with releasable joints. In this embodiment, a snow moving plow is mountable to the front compartment and can be pushed and controlled by the powered robot body. While a snow moving plow is described herein, the snow moving plow is one of a plurality of different interchangeable extension modules that are attachable to the vehicle body.

The robot vehicle may be additionally or alternatively provided with a support frame with an attachment joint (e.g., hitch ball) extending from the vehicle chassis that can be used to tow a boat, personal water craft or other item.

Example embodiments are described below with reference to the accompanying drawings, in which some, but not all example embodiments are shown. The examples described and pictured herein should not be construed as being limiting as to the scope, applicability or configuration of the present disclosure.

Like reference numerals refer to like elements throughout. Furthermore, as used herein, the term "or" is to be interpreted as a logical operator that results in true whenever one or more of its operands are true.

As used herein, "operable coupling" should be understood to relate to direct or indirect connection that, in either case, enables functional interconnection of components that are operably coupled to each other.

A working environment of robot vehicles can be categorized into two types: bounded and unbounded. For robots of the bounded type, such as robotic mowers, robotic watering devices, robotic floor cleaners, and robotic snow movers, they typically operate in an area defined by technical implementations (e.g., a guide wire) or physical boundaries (e.g., a wall, a fence, a curb) or a combination of both, and do not go outside of the bounded area. For robots of the unbounded type, such as robot mover, robot follower, and robot assistant, they usually roam or follow with or without a predefined destination.

Figure 1B:
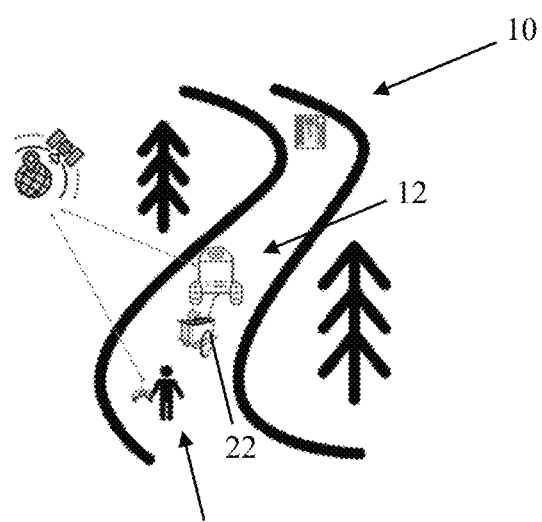

Operating environments 10 for a robot vehicle 12 are illustrated in FIGS. 1A and 1B. FIG. 1A illustrates an example operating environment 10 for a robotic vehicle 12 that may employ a system bounded by a guide wire 14. While the robot vehicle 12 may be considered as a robotic mower, it should be appreciated that a robotic mower is merely an example of a robotic vehicle that may employ an example embodiment. FIG. 1B illustrates an example operating environment 10 for a robotic vehicle 12 that may not have bounded working area or predefined route. While the robot vehicle 12 may be considered as a robotic mover that goes with an operator 16, it should be appreciated that a robotic mover is merely an example of a robotic vehicle 12 that may employ an example embodiment.

In one embodiment, as illustrated in FIG. 1A, the robotic vehicle 12 may be battery powered via one or more rechargeable batteries. Accordingly, the robotic vehicle 12 may be configured to connect to a power source dock or station for charging 18. The batteries may power a drive system and a blade control system of the robotic vehicle. However, the control circuitry 208 in FIG. 2 of the robotic vehicle may selectively control the application of power or other control signals to the drive system and/or the blade control system to direct the operation of the drive system and/or blade control system.

In one or more embodiments, the control circuitry 208 of the robotic vehicle 12 may be configured to communicate with an electronic device of a remote operator 16 via a wireless network or other radio frequency technologies. Example electronic devices include but are not limited to a computer, mobile telephone, PDA, smart phone, or similar device. In some embodiments, the radio frequency communication and other remote devices may not be employed.

Figure 2:
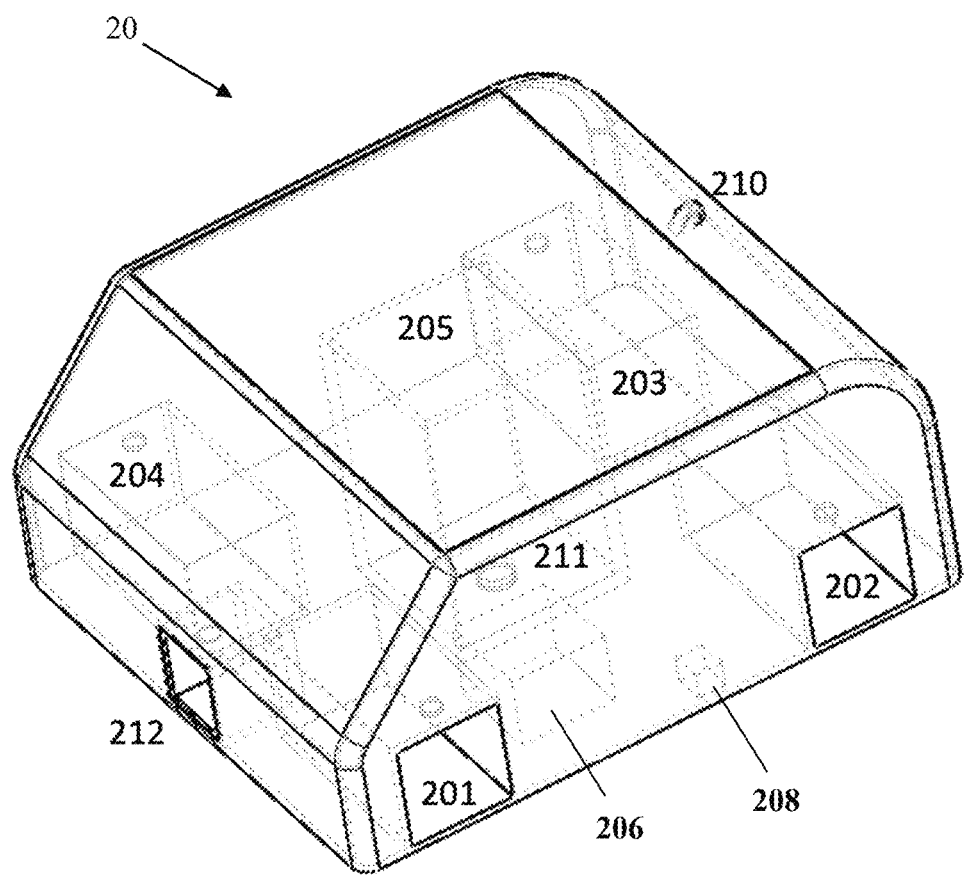
FIG. 2 is a side view of a chassis for a robot vehicle body.

A chassis for a robot vehicle body 12 is illustrated in FIG. 2. Different from the traditional chassis or cases of robot vehicles, the chassis 20 may comprise a plurality of motor compartments 201, 202, 203, 204, and 205. Depending on the application scenarios and practical needs, motors of different voltage, speed, torque, and other parameters can be selected and/or configured for driving the robot body and its external working module. Accordingly, the chassis may provide different compartments 201, 202, 203, 204, 205 for different sized motors. To support different extension modules 22, the chassis 20 also provides multiple attachment solutions.

Figure 4:
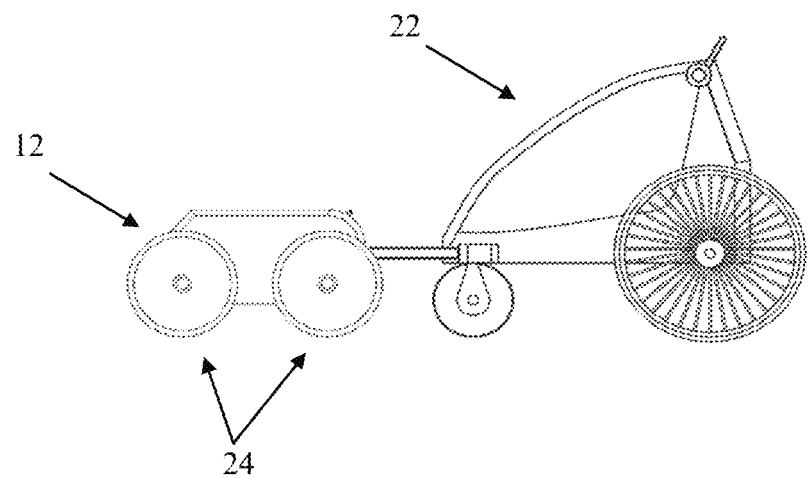
FIG. 4 illustrates the robot hitched with an extension module.
Figure 9:
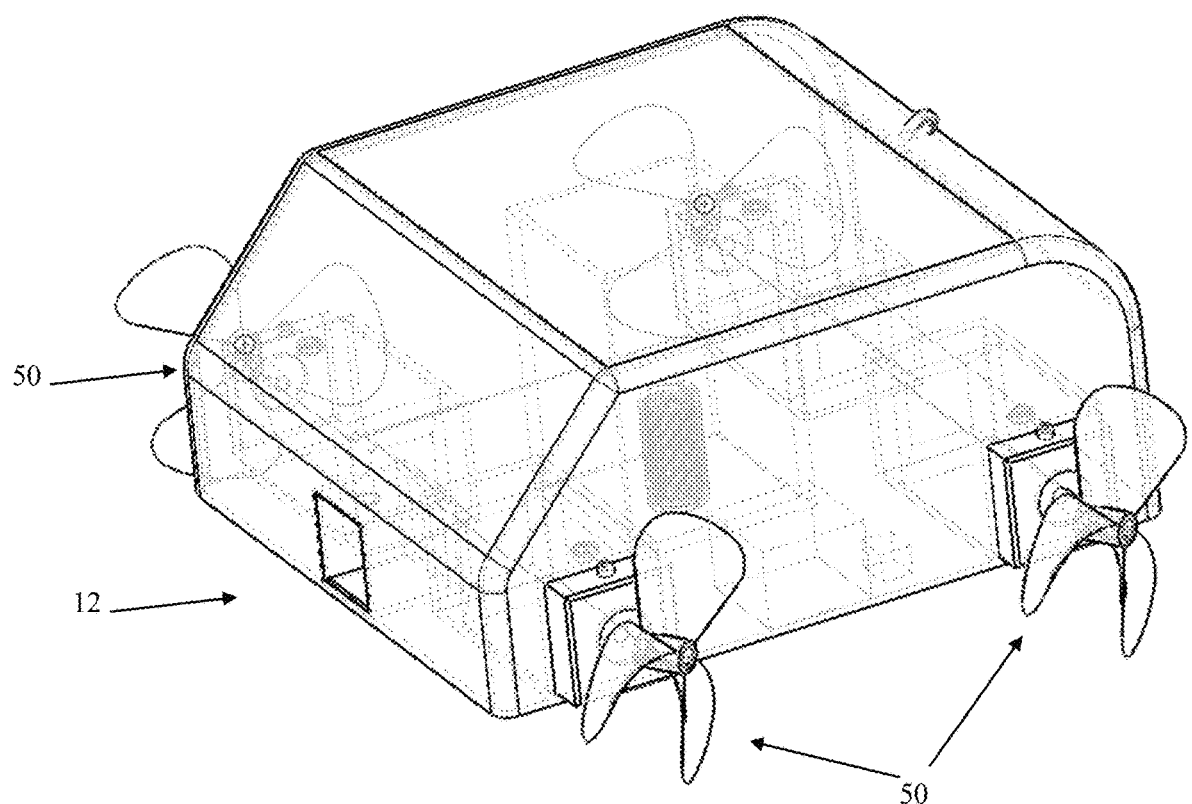
FIG. 9 is a side view of the robot vehicle with motor housing components and attached propellers.

In one or more embodiments of the vehicle 12, the at least one drive module may comprise a drive wheel 24 in FIG. 4 or propeller 50 as illustrated in FIG. 9, and an optional connector for coupling between a motor module and a drive wheel 24 or propeller 50.

Figure 10:
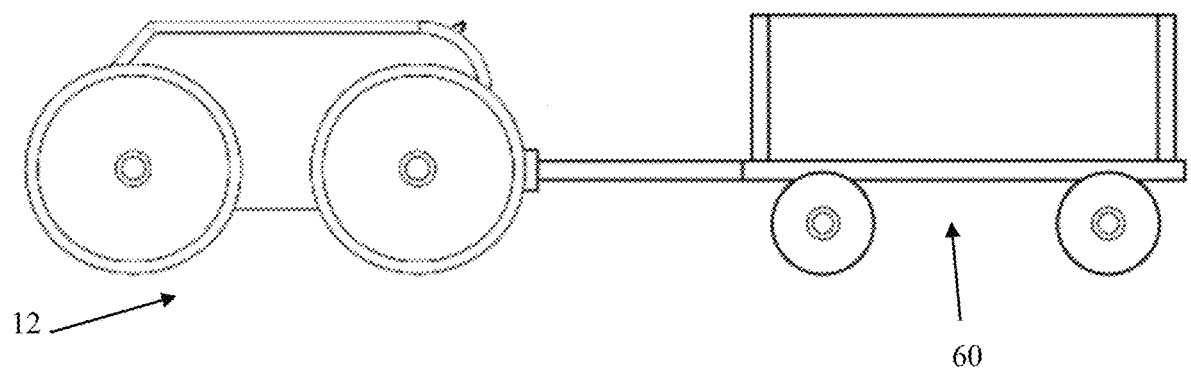
FIG. 10 illustrates the robot hitched with an extension module.

In one or more embodiments, the chassis 20 may utilize at least one hitch interface 210 at a rear or backward face for maneuverable attachment and detachment of a payload cart 60 as illustrated in FIG. 10.

Figure 5:
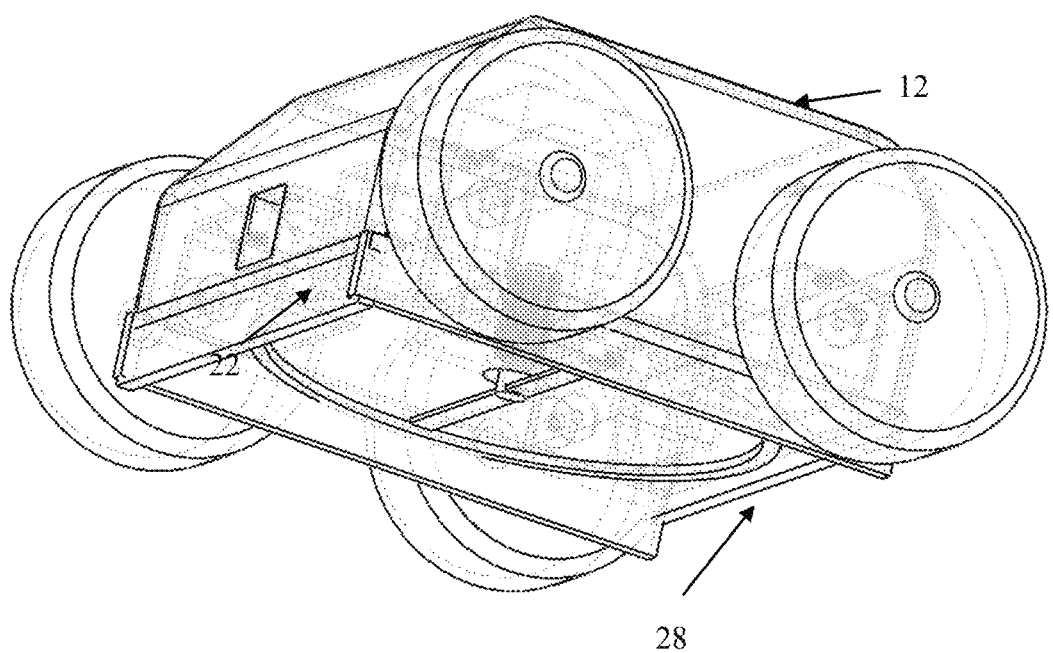
FIG. 5 illustrates the robot attached with another extension module.

In one or embodiments, an opening 211 at a bottom portion of the chassis 20 may be used to pivotally connect a lower cutting deck 28 in FIG. 5 and an upper motor module.

Figure 6:
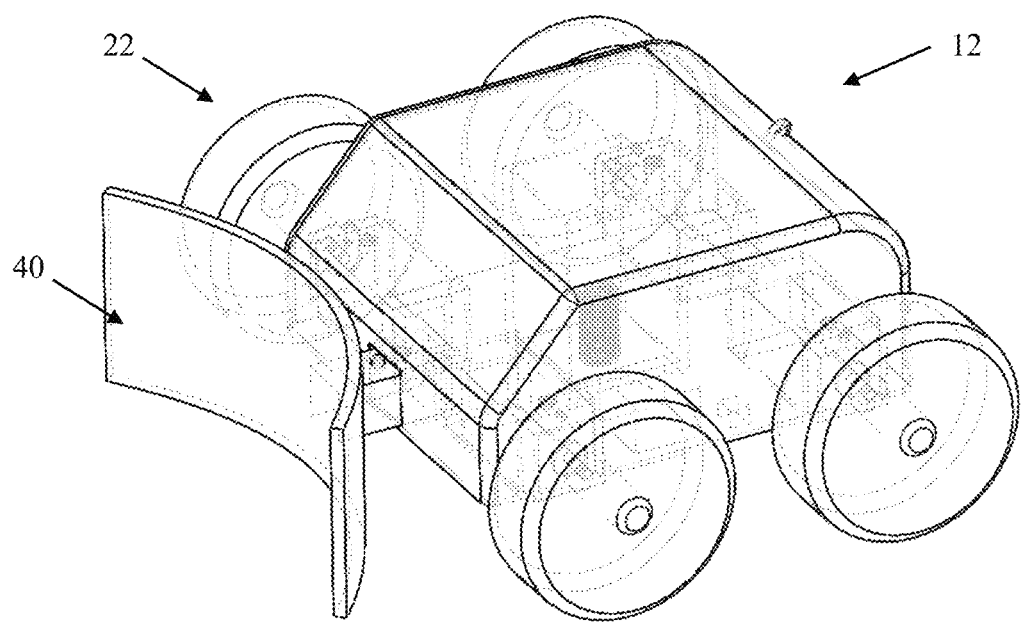
FIG. 6 illustrates the robot attached with another extension module.

In one or more embodiments, the chassis 20 uses one compartment 212 at a front or forward portion with a releasable coupling to attach a module such as a snow moving module 40 in FIG. 6.

In one or more embodiments, each of the chassis 20 and the extension module 22 may include a housing or cover to provide an aesthetically pleasing exterior, contain or repel materials, and/or protect components from impact or natural elements.

Figure 3:
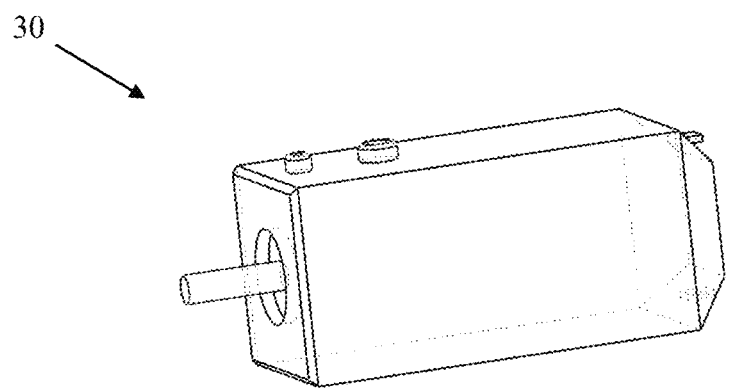
FIG. 3 is a side view of a motor housing component of the robot vehicle body.

A motor housing 30 component is illustrated in FIG. 3. The motor housing 30 component encapsulates a drive motor inside and has an opening to expose a motor outer shaft. The housing 30 may have dimensions similar to dimensions of one or more motor compartments 201, 202, 203, 204, and 205. allowing the motor housing to fit within a selected compartment 201, 202, 203, 204, 205. An inner integrated motor may have dimensions smaller than the housing's inner size allowing for the motor to fit therein. The housing 30 provides a plurality of end terminals that are interconnected with the motor's terminals and can be externally connected to the control circuit via wire connectors, after inserted into the motor housing 30 in chassis 20 as shown in FIG. 2. The motor housing 30 may also have a set of releasable buttons for one or both of installation and/or detachment of the battery component. For example, to install the battery component, the releasable button is pressed and the component pushed into the motor compartment of the chassis 20 and releasing the button such that the button "pops up" helps to secure the component in the compartment preventing lateral movement as the button is receiving in a corresponding aperture. To detach the component, the releasable button is again pressed and removed while the button is depressed.

In one embodiment, the chassis 20 in FIG. 2 and motor housing 30 components of FIG. 3 are combined such that the robot vehicle 12 provides a plug-and-play ability for drive motors that may adapt to various applications and requirements.

In one or more embodiments, when the robot vehicle 12 is configured as a mover for a daily family payload, the robot vehicle may be provided with two motor housing 30 components encapsulating motors of a small size, medium speed and low torque (e.g., motors of 3.5-inch length*1.26-inch diameter, at 60 rpm rated speed and with 0.7 Nm rated torque) at motor components 202 and 203 for example.

In one or more embodiments, when the robot vehicle 12 is configured as a mover for a daily family payload, pets, kids, and/or the like, the robot vehicle 12 may be provided with four motor housing 30 components encapsulating motors of a medium size, medium speed and medium torque (e.g., motors of 4.5-inch length*1.65-inch diameter, at 80 rpm rated speed and with 1.8 Nm rated torque) at motor components 201, 202, 203, 204.

In one or more embodiments, when the robot vehicle 12 is configured as a lawn mower, the robot vehicle 12 may be provided two motor housing 30 components encapsulating motors of medium size, medium speed and medium torque at motor compartments 202 and 203 and one housing components encapsulating a motor of large size, low speed and high torque (e.g., motors of 7-inch length*4.5-inch diameter, at 2000 rpm speed and with 2.5 N.m torque) at the motor compartment 205, for example.

FIG. 4 illustrates the robot vehicle 12 hitched with an extension module 22. In the embodiment illustrated, the extension module 22 is wagon. In one or more embodiments, the extension module 22 may be initially installed with motor housing 30 components including medium speed, low torque motors for a low-cost daily usage. Then to use the robot 12 as a helper for outdoor activities (e.g., a payload mover for baggage, pets, young kids) the extension module 22 can be reconfigured to adapt to the new requirements by upgrading motor modules to four motor components with medium speed and medium torque motors. At the same time, the reconfiguration can also engage other modules, such as power modules 206 and wheel modules. As illustrated in FIGS. 5-6, alternative extension modules 22 include, but are not are not limited to lawn mowers and snow plows.

Figure 7A:
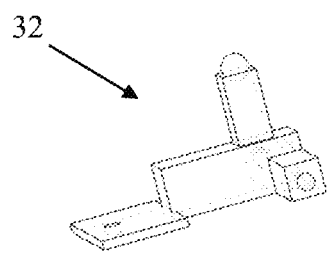
FIG. 7A is a support frame for a working module.
Figure 7B:
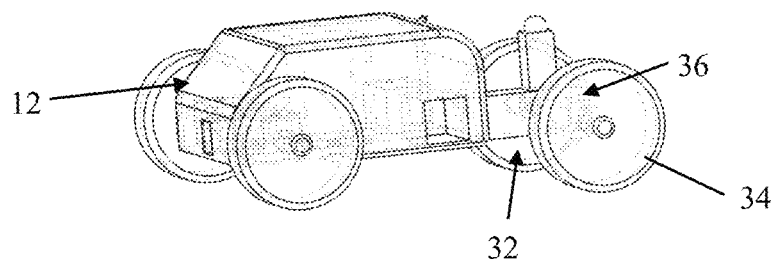
FIG. 7B illustrates the robot with a working module.

FIGS. 7A and 7B illustrate the robot with a working module including a support frame that works as a heavy-duty (e.g., boat, trailer, and/or like) dolly. FIG. 7A shows a support frame 32 that can be hooked on or otherwise connected to the base of the robot vehicle 12 chassis 20 to expand the chassis base structure and provide additional support. The support frame 32 also provides structures so that the power source and control circuit in the chassis can also extend to the working module. In an embodiment as illustrated in FIG. 7B, the support frame 32 is configured with tires 34 with high traction and a large motor housing 36 component with extremely high torque that may not otherwise be able to fit into any one of the motor compartments 201, 202, 203, 204, 205 in the robot chassis 20. Considering that such applications can be occasional or seasonal, the frame provides more flexibility in varying the use of the robot vehicle 12 as selected.

Figure 8A:
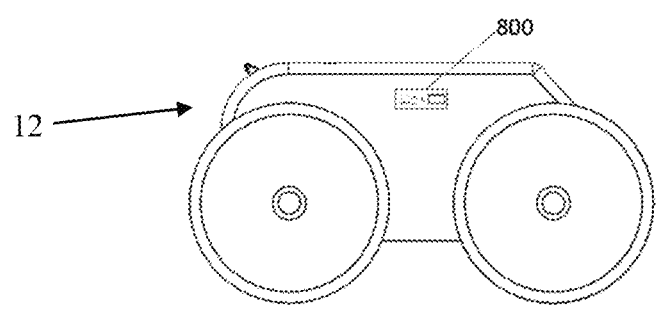
FIG. 8A is a side view of a robot vehicle with an optional entertainment module.
Figure 8B:
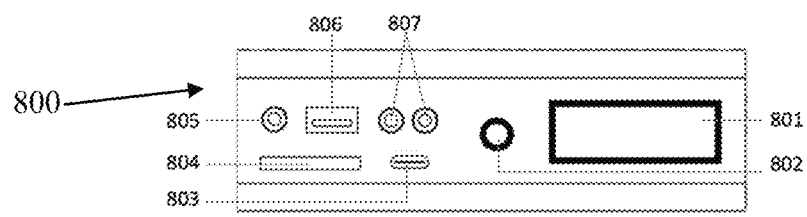
FIG. 8B illustrates an embodiment of entertainment module.

FIG. 8A exhibits the robot vehicle 12 with an optional entertainment module 800. It may be connected to a power module 206 or external power sources or other circuit. In one embodiment as shown in FIG. 8B, the entertainment module 800 provides an internal Bluetooth music player with display panel 801 and control button 802. In addition, the entertainment module 800 provides a dock for common interfaces USB-C 803, SD card reader 804, AUX interface 805, USB 806, and RCA interface 807. The dock can be used to power or control peripheral devices (e.g., audio players, decoration lights, STEM robot kits) for recreational or educational activities.

In one or more embodiments the power module 206 may support one or more batteries in a battery pack and may include a user interface to indicate the usage of the power. The power module 206, through the control circuitry 208, may then provide power to the robot vehicle, or the motor on the external module, or both.

In one or more embodiments, the wheel modules may be configured to operate either in a forward or backward direction but may otherwise not be steerable. However, in some alternative embodiments, the wheels may also be enabled to contribute to steering, or an additional set of wheels for providing steering inputs may be provided. The wheel module, depending on applications of the extension modules, may be a wheel set or a track that is a structure well known in the industry, and is not described in further detail herein.

The configurability of the motor module may be useful for enabling the interchangeability and upgrading described above. However, such modulization and configurability may also have other advantages. It brings in more flexibility in use and makes it possible to expand the robot's functions in different areas that may not be homogenous. A robot may no longer be limited to applications of a similar type (e.g., yard work like lawn cutting, lawn blower, snow moving, and/or like). The robot vehicle according to one or more embodiments herein may switch to completely different applications by changing or switching out one or more modules.

Moreover, the robot vehicle according to one or more embodiments herein may provide users more options in consideration of economy and effectiveness. The initial cost of a robot, including the expensive robot and accessories, and the deployment of the robot, is usually quite high. Robots are generally not affordable for families, or smaller and medium-sized businesses. While an expensive and powerful robot may cover some heavy-weight applications, it may not be needed as a start or may even be infeasible in other light-weight use cases where cost, portability, battery saving is much more weighted. As a result, the initial high cost can hinder consumer attempts to use robot devices. With the configurability in motor components and other modules as described herein, it is possible for consumers to start with some inexpensive configurations that meet some basic use, and later expand or upgrade with improved living standard and technology advancement.

As robots may work in some aggressive environments, for example, lawn with rare maintenance, trails with rough and bumpy conditions, snowy day with very low temperature, and may be prone to misuse where for example the robot is used to tow a trailer that is much more than its specified weight capacity, use can diminish the lifespan of the motor easily or even terminate its life immediately. It is common that customers have to discard the device or pay high service fees to fix the robot as a whole in such a condition. In contrast, the modular, pluggable motor components of the embodiments described herein make the maintenance affordable and user-friendly with simple tools or without tools.

The embodiments described herein provide a multitude of benefits including the production of an affordable multi-function household robot vehicle, eliminating the need for the purchase of multiple robot vehicles. A family could purchase a selection of attachments for the robot vehicle according to one or more embodiments described herein and gradually expand the selection of attachments for additional functions without having to purchase an additional or new robot vehicle.

Although the present disclosure has been described with reference to preferred embodiments, workers skilled in the art will recognize that changes may be made in form and detail without departing from the spirit and scope of the disclosure.

The invention claimed is:

1. A motor housing component connectable to a robot vehicle, comprising:
   a drive motor therein for the robotic vehicle and operably couplable to at least one drive wheel for the robot vehicle;
   a terminal interface couplable to control circuitry for the robot vehicle and when coupled thereto, an inner drive motor is responsive to control by the control circuitry;
   an aperture for exposing an outer shaft of the inner drive motor for connecting the motor to a wheel module or extension module;
   wherein the housing is insertable into a designated motor compartment in a chassis of the robot vehicle at a customizable depth so that the track width can be adjusted and securable therein by way of one or more release buttons on the motor housing component which connect to one or more apertures in the chassis.

2. A robot vehicle comprising:
   a modular chassis comprising a plurality of compartments with releasable couplings configured for mounting modularized components;
   a power module disposed within one of the compartments of the modular chassis, the power module comprising a power source and control circuitry;
   at least one replaceable and configurable motor housing module insertable into and removable from another compartment of the modular chassis, the motor housing module comprising a drive motor and a terminal interface couplable to the control circuitry, the motor housing module being configurable at a customizable depth within the chassis to adjust track width and securable by one or more release mechanisms;
   at least one drive module comprising a drive wheel or propeller and an optional connector for coupling between a motor module and a drive wheel or propeller; and
   one or more mechanisms on the robot vehicle body and/or the modular chassis configured for operable connection with a plurality of interchangeable extension modules.

3. The robot vehicle of claim 2 and further comprising an entertainment module for supporting Bluetooth play, wireless internet connection, recreational activities or a combination thereof.

4. The robot vehicle of claim 2 and further comprising at least one of the plurality of interchangeable extension modules operably coupled to the power module.

5. The robot vehicle of claim 2 and further comprising a hitch joint at a rear portion of the robot vehicle body configured for operably coupling to one interchangeable extension module wherein the interchangeable extension module is controllable and powered by the robot vehicle.

6. The robot vehicle of claim 5 wherein the extension module is a bike trailer comprising an arm frame that is operably coupled to the hitch joint.

7. The robot vehicle of claim 2 and further comprising a cutting deck that engages with one motor module through an opening therein and supports a plurality of cutting spades, the plurality of cutting spades being rotated with a motor having the power module.

8. The robot vehicle of claim 2 and further comprising a first compartment at a forward portion of the vehicle body and having releasable joints for coupling to one interchangeable extension module wherein the extension module is a snow plow and is mounted to the first compartment and movable by and controlled by the powered robot body.

9. The robot vehicle of claim 2 and further comprising a support frame with an attachment joint extending from the vehicle chassis and configured for towing a water craft, trailer, or boat, wherein the water craft, trailer, or boat is one of the plurality of interchangeable extension modules that are attachable to a support frame.

10. A robot vehicle chassis for mounting one or more modularized components to the robot body comprising:
   a plurality of compartments with releasable couplings for different sized motor housing components;
   at least one compartment with a releasable coupling for receiving a motor housing component;
   at least one slot for a power modules;
   at least one compartment at a forward portion of the chassis and with a releasable coupling to attach to a first extension module;
   at least one hitch interface at a backward portion of the chassis that is maneuverable to attach and detach a second extension module; and
   an opening at a bottom portion of the chassis through which a third extension module is connectable therethrough.

11. The robot vehicle chassis of claim 10 wherein the first extension module is a snow moving module.

12. The robot vehicle chassis of claim 10 wherein the second extension module is a payload cart.

13. The robot vehicle chassis of claim 10 wherein the third extension module is a cutting deck that is releasably and pivotally connected to a motor in the motor housing.

* * * * *